(12) United States Patent
Little

(10) Patent No.: US 7,899,280 B2
(45) Date of Patent: *Mar. 1, 2011

(54) LOW LOSS LATERAL OPTICAL WAVEGUIDE INTERSECTIONS

(75) Inventor: Brent E. Little, Greenbelt, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,669

(22) Filed: Aug. 17, 2009

(65) Prior Publication Data

US 2010/0046882 A1 Feb. 25, 2010

Related U.S. Application Data

(63) Continuation of application No. 10/487,011, filed as application No. PCT/US02/33881 on Oct. 23, 2002, now Pat. No. 7,577,320.

(60) Provisional application No. 60/343,709, filed on Oct. 26, 2001.

(51) Int. Cl.
*G02B 6/12* (2006.01)

(52) U.S. Cl. ............ 385/14; 385/123; 385/125; 385/129
(58) Field of Classification Search .................... 385/14, 385/123, 125, 129
See application file for complete search history.

(56) References Cited

U.S. PATENT DOCUMENTS 7,577,320 B2 * 8/2009 Little .............................. 385/14

* cited by examiner

*Primary Examiner* — Jennifer Doan
(74) *Attorney, Agent, or Firm* — W. Douglas Carothers, Jr.; Ross M. Carothers

(57) ABSTRACT

A geometrically shaped optical waveguide crossing with minimal transmission loss is described. A symmetrically tapered waveguide intersection is used to minimize loss in the intersecting region where at least two optical waveguides cross one another. The present invention embodies a waveguide crossing that includes tapering the width of the waveguides as they approach the intersecting region, forcing the field of light to contract, reducing asymmetric field distortions, and thus reducing transmission loss and effectively minimizing crosstalk. This is accomplished by focusing light through a perpendicular or near perpendicular intersection by simple linear tapering rather than by the use of a lens or other previously used devices.

6 Claims, 8 Drawing Sheets

(a)

(b)

LOW LOSS LATERAL OPTICAL WAVEGUIDE INTERSECTIONS

REFERENCE TO RELATED APPLICATION

This patent application is a continuation of U.S. application Ser. No. 10/487,011, entitled "Low Loss Lateral Optical Waveguide Intersections filed" Nov. 29,2005, now U.S. Pat. No. 7,577,320, which is the national stage of international application, Ser. No. PCT/US02/33881, filed Oct. 23, 2002 and claims priority of provisional patent application, Ser. No. 60/343,709 filed at the United States Patent and Trademark Office on Oct. 26, 2001, all of which are incorporated herein in their entirety.

BACKGROUND OF THE INVENTION

1. Field of the Invention

This invention relates to intersecting optical waveguides with reduced transmission loss. In high-density integrated optical circuits, waveguide crossings are inevitable. One characteristic that results from intersecting waveguide crossings is an intersecting region where light entering is no longer bound by the waveguide geometry. Light in an unbound intersecting region, analogous to a freely expanding wave without boundaries, freely expands and its phase front becomes parabolically curved to the point that the other side of the intersection can no longer collect the entire field of the expanded mode. Transmission loss results from this diffraction of the optical field, and is one of two known deleterious effects that commonly results from waveguide crossings.

Another deleterious effect that commonly results from waveguide crossings is crosstalk. Crosstalk occurs when one field in the first waveguide interferes with another field in the second waveguide. Crosstalk is eliminated when the intersecting region is prevented, by symmetry from decaying into the crossing waveguide, creating a one-dimensional tunneling effect. This effect is minimized here by the use of perpendicular intersections in this disclosure.

2. Description of Related Art

Ideal waveguide crossing design in conventional devices has been a matter of trial and error. The two barriers in creating a prefect waveguide crossing are transmission loss and crosstalk between the waveguides. High losses associated with bends in conventional waveguides, along with the resulting transmission loss, as seen in untapered perpendicular intersections, has forced conventional designers to create shallow-angle crossings that make it even more difficult to achieve low crosstalk. Crosstalk increases when two optical fields spend greater time together as is the case when waveguides intersect at shallow angles.

One such disclosure is described in U.S. Pat. No. 4,961,619, which modifies prior art waveguide crossings having a predetermined angle of intersection by decreasing the dimensions of the waveguides transverse to the direction of propagation, but in the plane of the intersecting waveguides, as the waveguides approach the region of intersection. The disclosure focuses on maintaining the shallow angle of intersection and even reducing the angle below that which is commonly allowed with "unmodified" waveguides.

U.S. Pat. No. 6,198,860 provides for a photonic crystal resonator system, or resonator system by itself, at the intersection of two waveguides. The photonic crystals are made up of materials that restrict the propagation of light to certain frequency ranges.

The high losses associated with bends in conventional waveguides that has forced conventional designers to create shallow-angle crossings is described in U.S. Pat. No. 6,198,860, which specifies the advantage of using photonic crystals. Another alternative to photonic crystals is also discussed in the article of B. E. Little and S. T Chu entitled, "Towards Very Large Scale Integrated Photonics", *Optics and Photonics News*, November 2000. The article explains the use of a Manhattan grid as opposed to photonic crystals.

U.S. Pat. No. 5,157,756 describes a waveguide intersection containing an island region analogous to the intersecting region, but also containing a peripheral region having a refractive index lower than that of the waveguides. The invention also claims a predetermined angle of intersection for the waveguides similar to that of U.S. Pat. No. 4,961,619, discussed above.

SUMMARY OF THE INVENTION

This invention provides for geometrically designed waveguide crossings that minimize transmission loss. More particularly, this invention pertains to a simple symmetrical constraint of tapered waveguides as they approach the intersection, focusing the field of light through the intersecting region, minimizing the diffraction, and reducing the transmission loss. Additionally, the waveguides intersect perpendicularly to simplify the attainment of perfect waveguide crossings with effective elimination of crosstalk. The waveguides do not have to be single mode, but also work for single or multimode waveguides.

In accordance with one embodiment of the invention, there exists an optical waveguide structure having a first waveguide that propagates a field in a first direction, a second waveguide that propagates a field in a second direction, and a waveguide crossing where the first waveguide crosses the second waveguide, and where both the first and second waveguides taper in width as they approach the crossing. A third intersecting waveguide meeting the first two at an angle of 90° is also possible without limiting the embodiment of the invention, which is analogous to a z axis intersecting an x and y axis at the point in which the x and y axis intersect each other. The embodiment of the described invention is the short inward tapering of the waveguides prior to the intersection, crossing perpendicularly with respect to each other. Hence, the invention includes any means for creating tapered waveguides as they approach an intersection or intersecting region, the intersection of which is specified as an angle of 90° or near 90°, thus focusing the field through the intersecting region.

The present invention is distinguished from U.S. Pat. No. 4,961,619, in the manner in which the guides are tapered, the purpose for tapering the guides, the physics of the interaction, and the different results obtained. The present invention negates the need for an intersecting angle other than 90°. Waveguide crossings that intersect perpendicularly simplify the attainment of perfect crossings and greatly minimize all possible crosstalk, allowing reduction of transmission loss. In the past, perpendicular waveguide crossings have been created requiring the use of photonic crystals to focus the light field through the intersecting region, exemplified in U.S. Pat. No. 6,198,860, described above.

The goal of this invention is to mitigate transmission loss attributed to the field distortions arising from the waveguide-to-waveguide interactions within the intersecting region by focusing without the use of photonic crystals or lenses or other devices, while the primary purpose remains, as reported in U.S. Pat. No. 4,961,619, to mitigate the loss prior to the intersection region. The field distortions in the disclosure described in U.S. Pat. No. 4,961,619 arise from the fact that at shallow crossing angles, the crossing waveguides approach each other and remain close to each other over long propagation distances. As a result, the optical fields in one waveguide are modified by the other waveguide. The present invention avoids having to address this issue by maintaining a perpendicular angle or near perpendicular angle of intersection for the waveguides.

Another important and distinct aspect of the present invention is the non-adiabatic tapering of the waveguides so that the waveguides, themselves, act as a lens to focus the field of light through the intersecting region. In U.S. Pat. No. 4,961,619, the incorporation of adiabatic tapering of the waveguides is required. In this earlier disclosure, the waveguides are tapered down over a length of approximately 100 µm, which is much larger than the wavelength of light (about 1 µm). The waveguides of the present invention typically taper down over a much shorter length of 1 µm to 3 µm.

The present invention also predicts, and the resultant device indicates by experiment, an improvement in loss by a factor of 10, while earlier disclosures, such as described in U.S. Pat. No. 4,961,619, had improvements from loss of only by a factor of about 2. In the prior art, the descriptive requirement states that the two intersecting waveguides be in sufficiently close proximity to the other of the at least two waveguides, so as to distort asymmetrically. For the present invention, the 90° angle or near 90° angle of intersection of the waveguide is itself sufficient to eliminate the guide-to-guide interaction.

The present invention can also be distinguished from U.S. Pat. No. 6,198,860 in that the present invention accomplishes a different result than that produced by the photonic crystal, by means of symmetrical tapering of the waveguides to focus the field of light through the intersecting region. Symmetrical tapering of waveguides creates no restriction of certain frequency ranges of light, as does photonic crystals. The present invention relates to purely conventional waveguides, distinguishable from those containing photonic crystals which can have no radiation modes and typically exist in metallic waveguides for microwaves, not optical circuits of the third independent claim, claim 33, of U.S. Pat. No. 6,198,860, which describes a resonator system at the intersection. In conventional waveguide crossing, the intersection region is not an intersecting region or resonator. Photonic crystals will not work for conventional waveguides because most of the light is diffracted out of the waveguide system in conventional waveguide crossings.

The present invention negates the need for a peripheral region and islanding or any such change in media altering the refractive index of the waveguide intersection, as is described in U.S. Pat. No. 5,157,756. Again, the present invention also specifies perpendicular intersections as opposed to sharp, predetermined intersecting angles.

U.S. Pat. No. 5,157,756 also refers to adiabatic tapering of waveguides, but also teaches that such tapering is only effective to shallow angles of intersection, and angles of greater than 7 degrees result in little improvement, and in fact lead to increased loss. In contrast, the present invention utilizes non-adiabatic tapering of waveguides at angles or near 90°.

BRIEF DESCRIPTION OF THE DRAWINGS

In the drawings wherein like reference symbols refer to like parts:

FIG. 2(*b*) depicts a diffraction of the phase fronts, depicted by dashed curves, in the intersection region of an untapered waveguide crossing.

FIG. 4(*b*) is a plan view of the tapered waveguide depicting the taper section, which changes in width from $W_1$ to $W_2$ as the waveguide approaches the intersecting region.

FIG. 5(*b*) is simulation geometry of a more realistic tapered waveguide crossing containing a blunted etch as opposed to sharp points, which is taken into consideration in the practice of this invention.

FIG. 6(*b*) shows the junction loss versus taper waist with a bus waveguide width of 2.0 µm.

FIG. 6(*c*) shows the junction loss versus taper waist with a bus waveguide width of 1.0 µm.

FIG. 6(*d*) shows the junction loss versus taper waist with a bus waveguide width of 3.0 µm.

FIG. 8(*b*) shows the junction loss as a function of taper length, with a minimum taper width of 0.7 µm. The minimum transmission loss is plotted along with the theoretically calculated loss.

DETAILED DESCRIPTION OF DISCLOSURE EMBODIMENTS

Figure 1:
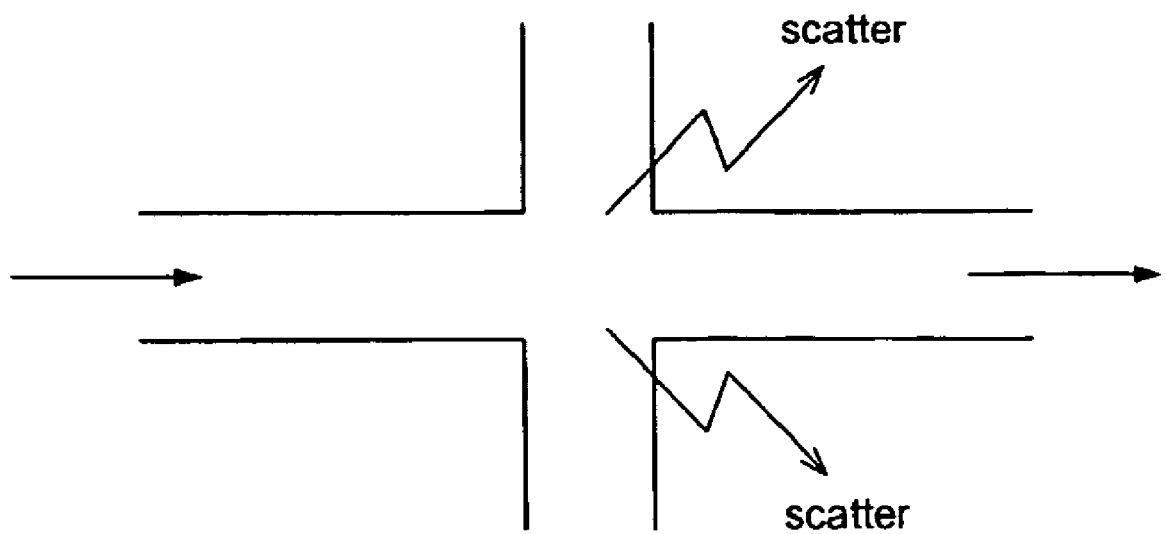
FIG. 1 is a plan view of untapered crossing waveguides, depicting the scattering of light in the waveguide junction region.
Figure 2A:
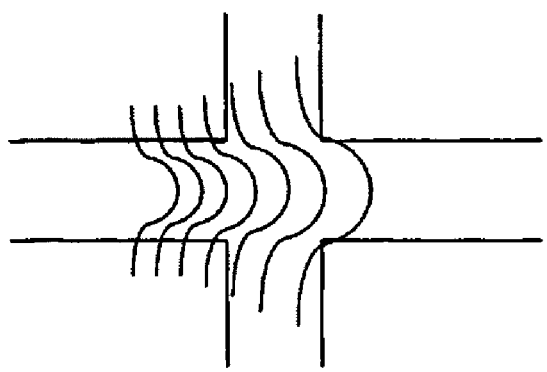
FIG. 2(*a*) depicts a diffraction of the amplitude in the intersection region of an untapered waveguide crossing.
Figure 2B:
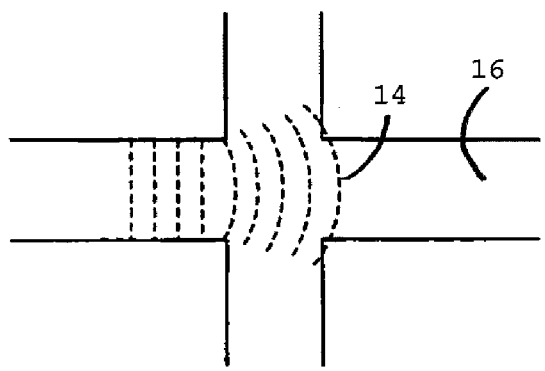

The invention comprises a low loss lateral waveguide intersection. This invention minimizes the focus on optical field distortions resulting from the influence of interfering fields from an adjacent or lateral waveguide having perpendicular intersections. Such a lateral and perpendicular intersection allows for two waveguides crossing in a precise geometric pattern. Three waveguides could potentially intersect perpendicularly in a three-dimensional waveguide crossing. A major feature of the inventive concept is that it reduces transmission loss due to diffractive scattering of light in the intersecting region illustrated in FIG. 1. Transmission loss results from the diffraction of the optical field in the intersecting region where the field is no longer bound by the waveguide geometry. FIG. 2(*a*) shows the diffraction of the amplitude as the field of light expands in the intersecting region. This expanding field causes the phase front to be parabolically curved, as depicted in FIG. 2(*b*) at 14, where the waveguide at the output waveguide 16 can no longer collect the entire field of the expanded mode.

Figure 3:
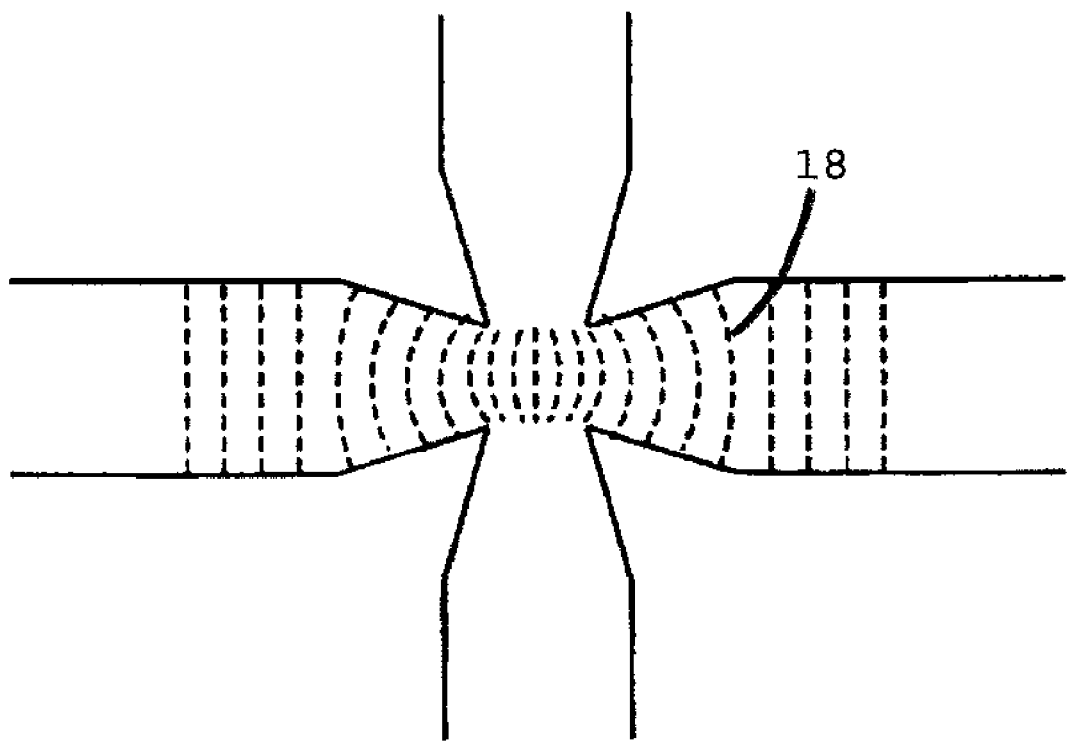
FIG. 3 depicts a diffraction of the phase fronts in the intersection region of a pair of crossing waveguides having inward or converging waveguide tapers.
Figure 4A:
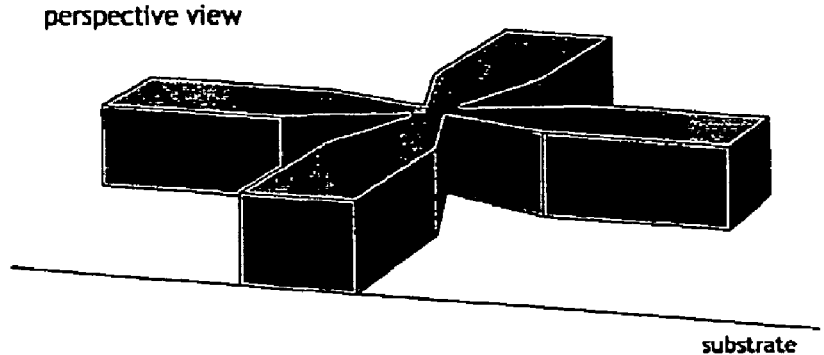
FIG. 4(*a*) is a perspective view of the tapered waveguide crossing on a substrate.
Figure 4B:
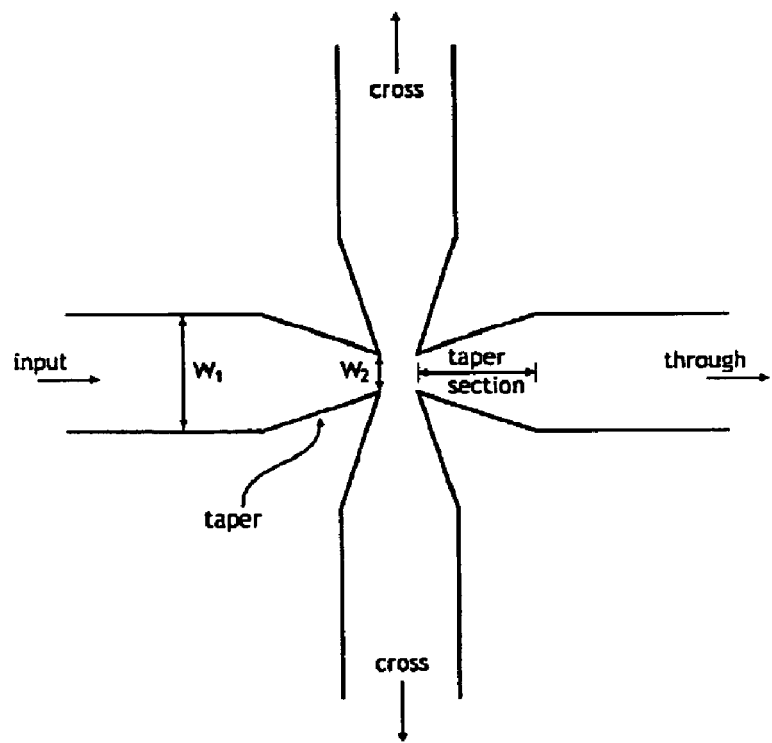

In this disclosure, means is required to focus the field of light through the intersecting region, either with a lens or by use of simple geometry. Here, focusing is defined as spatially contracting the optical beam and curving its phase front as could be performed by the use of the more conventional focusing lens. An embodiment of the present invention is to focus the light through the intersecting region by use of simple geometry to minimize scattering, and thus, minimize transmission loss. Simple geometry in tapering the waveguide as it approaches the intersecting region causes the field to contract as well as introducing an inversely parabolic phase front. This effect is subsequently undone by diffraction as the field expands in the symmetrically tapered output waveguide, shown in FIG. 3 at 18. These tapers are not adiabatic. FIG. 4(a) shows a perspective view of the waveguide crossing at 90° as it exists on a substrate, and FIG. 4(b) shows how the tapers are purely linear with an input width equal to the bus waveguide width ($W_1$), and a minimum taper waist prior to the intersection ($W_2$).

Figure 5A:
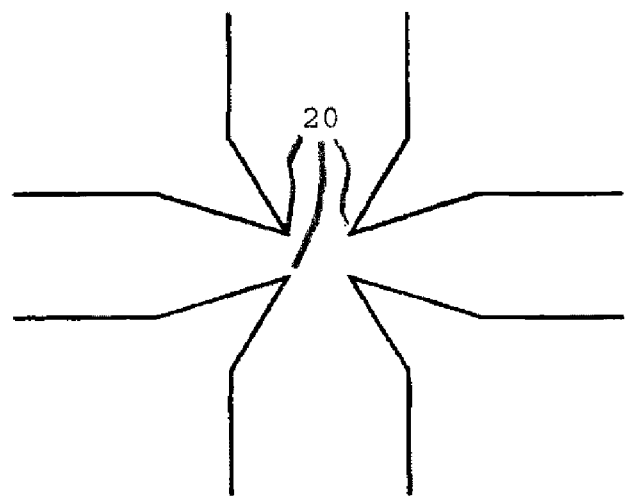
FIG. 5(*a*) is simulation geometry of a theoretical tapered waveguide crossing containing sharp etched corners.

The tapered waveguides were modeled numerically using the Beam Propagation Method. FIG. 5(a) depicts simulation geometry of a theoretical tapered waveguide crossing containing sharp etched corners 20. Limitations in the etching capabilities result in minimum feature dimensions. Particularly, sharp points cannot be realized in practice, where points become blunted with some minimum width, as shown in FIG. 5(b).

The effect of finite etching resolution is also investigated where FIG. 6 depicts simulations of the transmission efficiency for various values of the taper parameters. FIG. 6(a) shows the junction loss versus the bus waveguide width in the absence of any taper. Desirable single mode waveguide widths, in this case, are from 1 μm to 2 μm. For these widths, non-tapered junctions may experience 6% loss or more. For architectures that require many crossings, insertion loss can rapidly accumulate. Loss can be decreased by about an order of magnitude by means of simple linear tapers. Optimized tapers may lead to even lower losses, as depicted in FIG. 6b to FIG. 6d. These are modeled experimental results that exemplify how transmission efficiency changes with different taper waist diameters. Ideally, the goal is to have transmission efficiency at or as near as possible to 1.00.

Figure 5B:
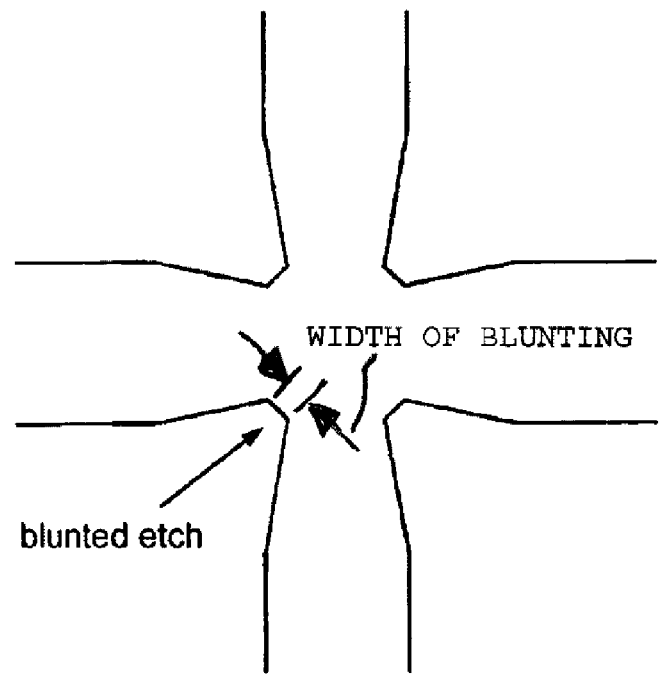
Figure 6A:
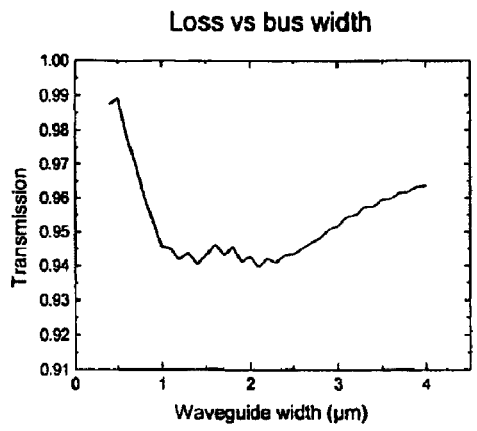
FIG. 6(*a*) shows the junction loss versus the bus waveguide width in the absence of any taper.
Figure 6B:
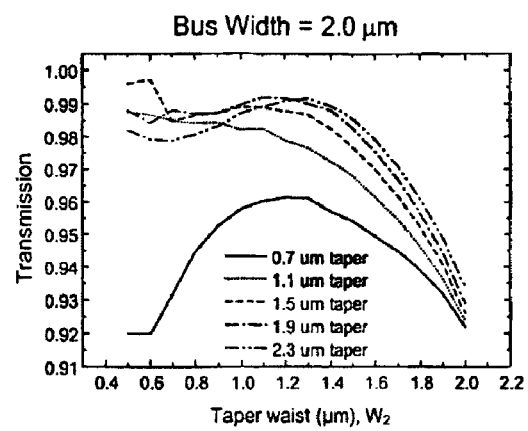
Figure 6C:
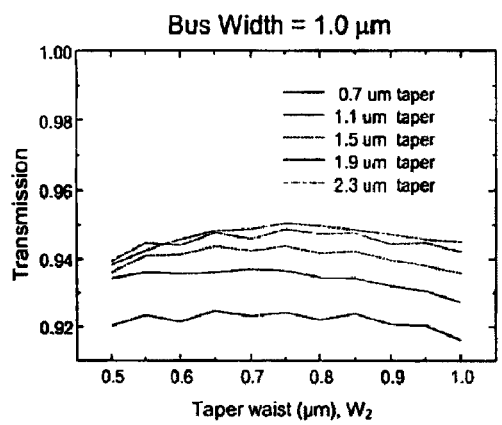
Figure 6D:
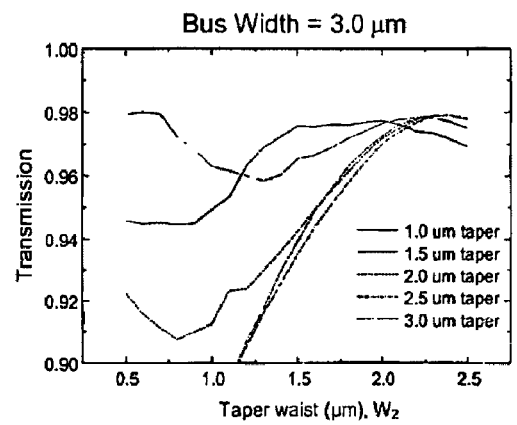
Figure 7:
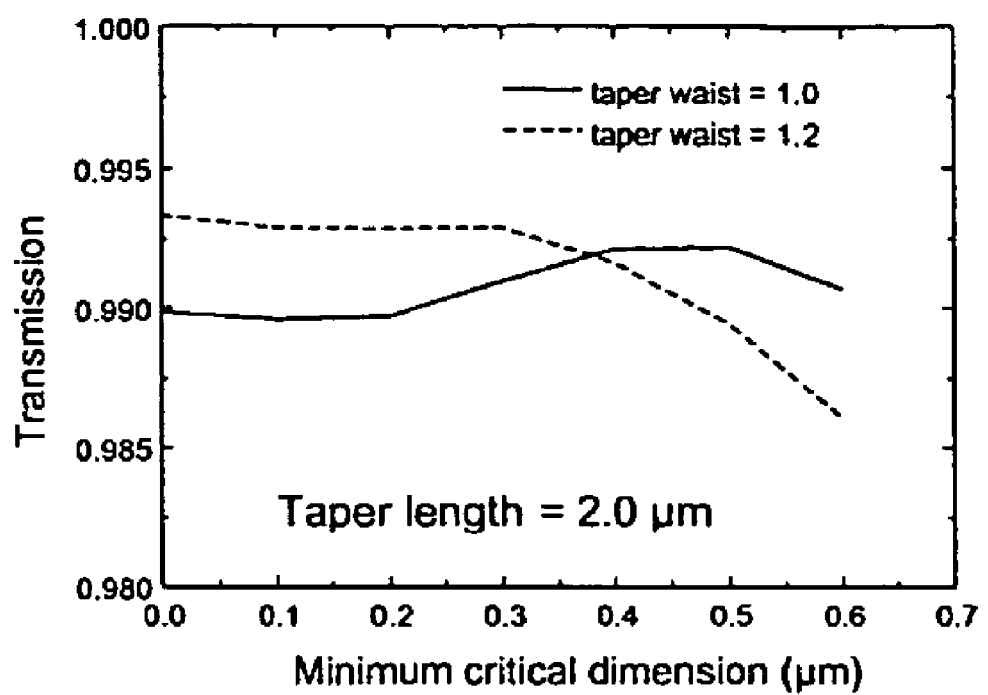
FIG. 7 is the effective of the minimum etching feature size on the power transmission efficiency across a tapered junction.

The effect of finite etching resolution is also investigated, as seen in FIG. 5(b). The minimum etch feature, or critical dimension, is the width of the blunting. FIG. 7 shows the transmission as a function of critical dimension for two separate taper lengths. What is revealed is the fact that the power transmission efficiency for an optimized linear taper does not degrade for critical dimensions less than 0.4 μm. Furthermore, some taper lengths have greater efficiency, thus indicating that the critical dimensions do not play a significant factor in the practical implementation of tapered crossings.

The inventive waveguides were fabricated on a thermal oxide with a refractive index of 1.448, as known by those skilled in the art. In the fabricated devices, the core refractive index was 1.60, the cladding refractive index 1.34, and the nominal waveguide dimensions were 2 μm wide ($W_1$ in FIG. 4) by 1.75 μm thick. Measurements in the plotted data were taken at a wavelength of 1.55 μm.

Figure 8:
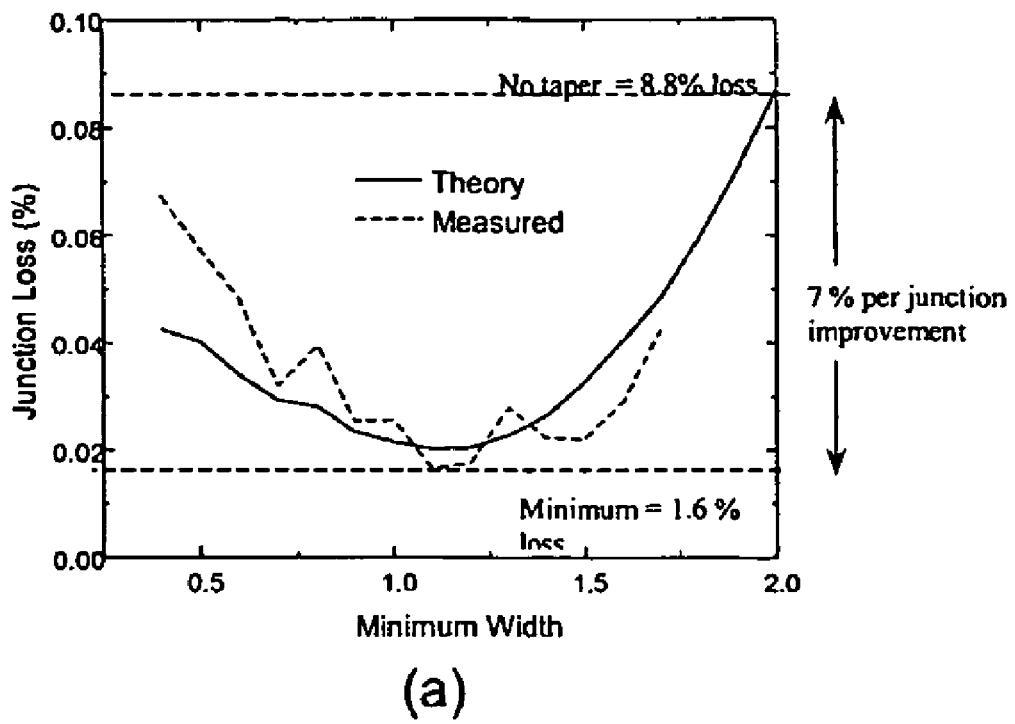
FIG. 8(*a*) shows the junction loss as a function of minimal taper width, with a taper length of 2 µm. The minimum transmission loss is plotted along with the theoretically calculated loss. The loss was reduced by 7.2% compared to the case of no taper.
Figure 8:
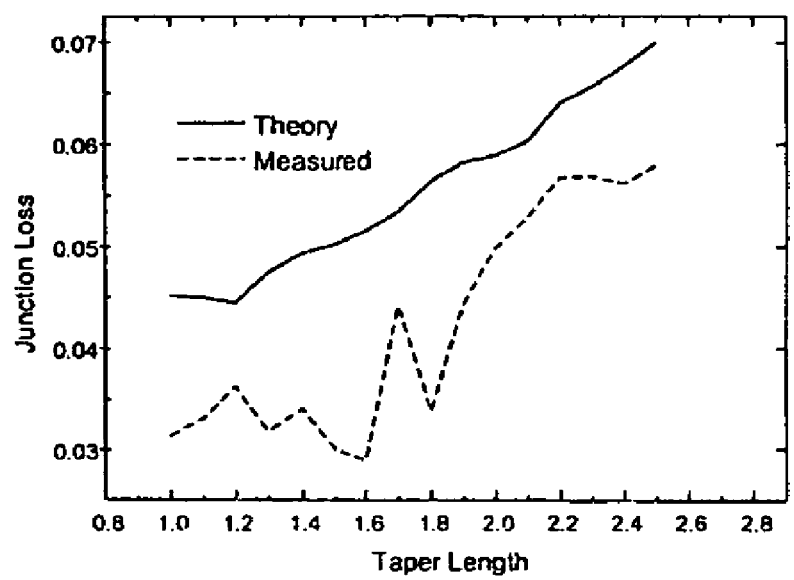

FIG. 8(a) shows the junction loss as a function of taper width ($W_2$ in FIG. 4), while FIG. 8(b) shows the loss as a function of taper length. In the experiment, numerous devices were fabricated containing 5, 10, and 20 sequential junctions. The overall average of these measurements was plotted. The taper length for FIG. 8(a) was 2 μm. The minimum taper width for FIG. 8(b) was 0.7 μm. The measured transmission was plotted together with the theoretically calculated loss. The loss in FIG. 8(a) was reduced by 7.2% compared to the case where no waveguide taper was utilized.

I claim:

1. An optical device comprising:
   a first waveguide extending in a first direction; and
   a second waveguide extending in a second direction substantially perpendicular to the first direction, the first and second waveguides intersecting at an intersection region, a first portion of the first waveguide being spaced from the intersection region,
   wherein a width of the first waveguide narrows from the first portion of the first waveguide toward the intersection region, such that the first waveguide focuses an optical beam which propagates along the first waveguide from the first portion of the first waveguide toward the intersection region.

2. The optical device of claim 1 further comprising a second portion of the first waveguide being spaced from the intersection region, the first and second portions of the first waveguide being positioned on opposing sides of the intersection region,
   wherein a width of the first waveguide narrows from the second portion of the first waveguide to the intersection region.

3. The optical device of claim 2, wherein a first portion of the second waveguide is spaced apart from the intersection region and a second portion of the second waveguide is spaced apart from the intersection region, the first and second portions of the second waveguide being positioned on opposing sides of the intersection region,
   wherein a width of the second waveguide narrows from the first portion of the second waveguide to the intersection region and the width of the second waveguide narrows from the second portion of the second waveguide to the intersection region.

4. The optical device of claim 1, further comprising a third waveguide extending in a third direction substantially perpendicular to the first and second direction, the third waveguide intersecting the first and second waveguides at the intersection region.

5. The optical device of claim 1, wherein the first portion of the first waveguide is spaced a distance of approximately 3 microns from the intersection region.

6. The optical device of claim 1, wherein the first portion of the first waveguide is spaced a distance of no more than approximately 3 microns from the intersection region.

* * * * *